Dec. 11, 1956  J. FRASER  2,773,707
SELECTIVE INTERLOCKING LUG COUPLING
Filed Dec. 10, 1953  2 Sheets-Sheet 1
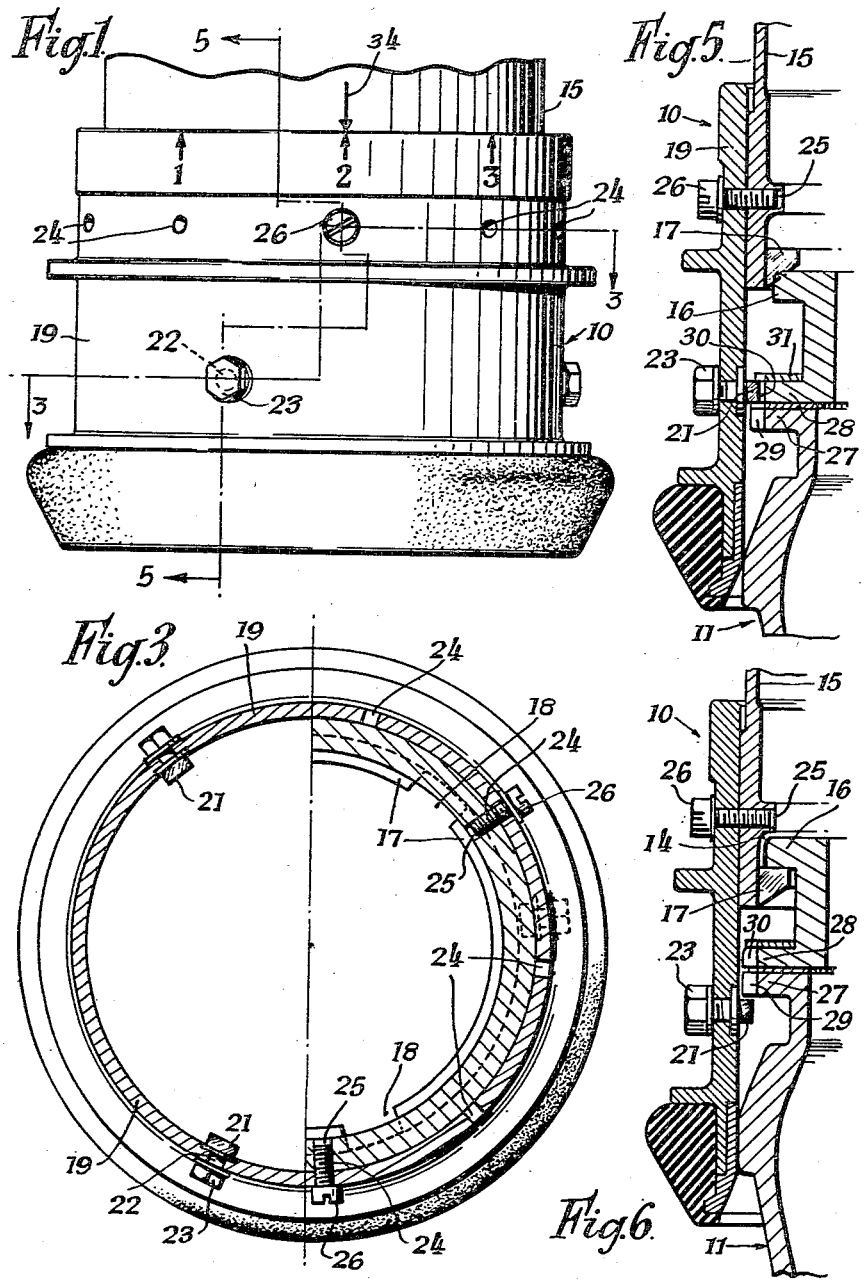
INVENTOR
John Fraser
BY

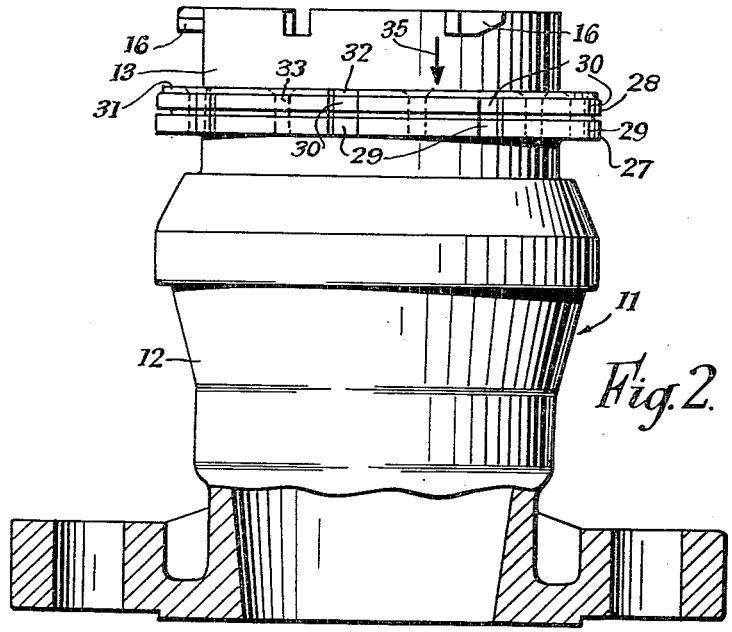
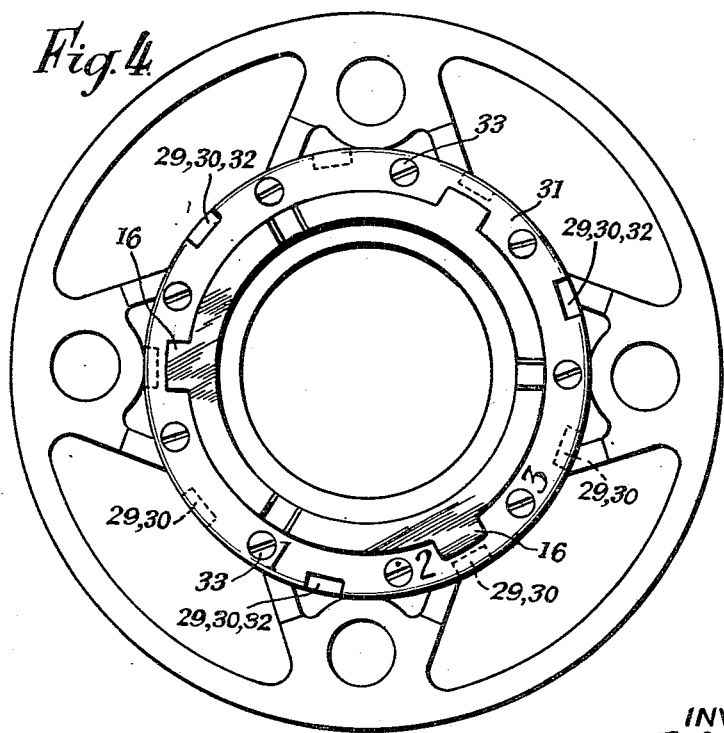

United States Patent Office 2,773,707
Patented Dec. 11, 1956

2,773,707

SELECTIVE INTERLOCKING LUG COUPLING

John Fraser, Tolworth, Surbiton, England, assignor to Avery-Hardoll Limited, Tolworth, Surbiton, England Application December 10, 1953, Serial No. 397,369

Claims priority, application Great Britain December 11, 1952

2 Claims. (Cl. 285—27)

This invention relates to bayonet-type couplings, that term being used to include any form of coupling in which radial projections on one member are inserted axially in slots or notches in the other member and the two members are then turned one relative to the other to bring the projections into circumferential slots or grooves, or behind a flange, on the said other member, thus preventing axial separation of the members.

When a large number of such couplings are used for a common purpose, such as, for example, the coupling of fuel supply lines to the fuel tanks of aircraft or vehicles, it is convenient to make all of the said couplings identical, so that any one coupling member will mate with any complementary coupling member, but at the same time it may be desirable that some coupling members will mate only with particular complementary coupling members, for example to avoid the supplying of the wrong fuel to an aircraft when a choice of fuels is available.

The object of the present invention is to provide, in bayonet type couplings which are constructed so that any one coupling member will mate with any complementary coupling member, auxiliary means adapted for mounting on the coupling members which prevent engagement of the said members unless the said means are appropriately disposed on both said members.

According to one aspect of the invention, in a bayonet-type coupling one of the coupling members has attached thereto additional projections, and the other coupling member has attached thereto a notched ring, the arrangement being such that the said additional projections must pass the notched ring before relative rotation of the members can be effected to engage the coupling, and that the said additional projections can pass the notched ring only if they are in a predetermined angular relation to the bayonet projections.

According to another aspect of the invention, in a bayonet-type coupling the coupling members are provided, in addition to the bayonet projections and slots or equivalent, with co-operating elements permitting relative axial movement of the members to the position for relative turning to the engaged position only at predetermined relative angular positions of said members.

According to another aspect of the invention, in a bayonet-type coupling one member of the coupling is adapted to receive a plurality of selectively positionable projections other than the bayonet projections, and the other member is adapted to receive selectively positionable baulking means, so that, by mounting the projections and baulking means in different positions relative to the bayonet projections and slots or equivalent on two identical couplings, cross-mating of the coupling members is prevented.

The invention is hereinafter described with reference to the accompanying drawings, in which:

Figure 1 is an elevation of one member of a bayonet-type pipe coupling;

Figure 2 is an elevation of the other member of the coupling;

Figure 3 is a section on the line 3—3 of Figure 1;

Figure 4 is a plan view of the coupling member shown in Figure 2;

Figure 5 is a partial longitudinal section through the coupling members in a partially engaged condition, the section being taken on the line 5—5 of Figure 1; and Figure 6 is a section similar to Figure 5 but showing the members in the relative axial positions in which they can be turned one relative to the other to engage the bayonet elements.

The coupling shown in the drawings is a valved pipe coupling of known type, such as disclosed in Patent No. 2,655,926, but the valve mechanism has been omitted, only the bodies of the two coupling members being shown. The coupling member 10 shown in Figure 1 is intended for mounting on the end of a hose, and the coupling member 11 shown in Figure 2 is intended for mounting in a fixed position to form a supply point. Thus the hose can be attached to the supply point by means of the coupling, and its other end connected by a similar coupling to the tank or like receptacle to which liquid is to be supplied.

The coupling member 11 comprises a body 12 and a separate end portion 13 which enters a recess 14 in the body 15 of the coupling member 10, the said end portion 13 carrying three outwardly projecting radial lugs 16 spaced at equal intervals about its circumference. At the mouth of the recess 14 in the body 15 of the coupling member 10 is an inwardly directed flange 17 formed with three notches 18 so positioned that the lugs 16 can pass through them, subsequent relative turning of the members 10 and 11 causing the lugs 16 to pass behind the flange 17 and so lock the said members together. The coupling member 10 has mounted on it a surrounding sleeve 19 which projects over the coupling member 11 when the two are engaged, the sleeve 19 carrying three equally angularly spaced radial inward projections 21 formed by rectangular heads on studs 22 passing through the wall of the sleeve 19 and secured by nuts 23 on the outer side thereof. The projections 21 are spaced axially from the flange 17. Nine equally spaced radial holes 24 are formed on a circumferential line surrounding the sleeve, and three equally spaced screw-threaded holes 25 are formed in the body 15, so that set bolts 26 passed through three of the holes 24 into the holes 25 secure the sleeve 19 in position on the body 15. The sleeve 19 can thus be secured to the body 15 in positions providing three relative angular dispositions of the notches 18 and the projections 21.

The body 12 and end portion 13 of the coupling member 11 are formed respectively with circumferential flanges 27 and 28, these flanges being formed respectively with equally spaced notches 29 and 30 in their peripheries, and the two parts being arranged so that the notches in the two flanges coincide. A ring 31 rests against the flange 28, the ring 31 having three equally spaced notches 32. The ring 31 and flanges 27 and 28 are secured together by nine set screws 33 passing through nine sets of mating holes in the ring and flanges. The ring 31 can thus be secured to the coupling member 11 in several positions in each of which the notches 32 coincide with three of the notches 29 and the aligned notches 30, the ring 31 obstructing the remaining notches 29 and 30, and, by selecting the position of the ring 31 the unobstructed notches 29 and 30 can be provided in any one of three angular dispositions relative to the lugs 16.

The angular positions of the notches 29 and 30 relative to the lugs 16, the angular positions of the holes 25 relative to the notches 18, and the angular positions of the projections 21 relative to the holes 24 are such that when the lugs 16 are axially aligned with the notches 18, the projections 21 are also aligned with three of the notches 29 and 30, so that if the ring 31 is so positioned that the notches 32 therein are aligned with those particular notches 29 and 30 the coupling members can be moved axially towards each other to the position shown in Figure 6, in which they can be turned one relative to the other to interlock them. If, however, the ring 31 is so positioned that the notches 32 therein are aligned with other notches 29 and 30, the coupling member 11 can be entered into the coupling member 10 only until the lugs 16 strike the flange 17, as shown in Figure 5, in which position the members cannot be turned one relative to the other since the projections 21 are located in the notches 30.

It will thus be seen that a coupling member 10 will mate with a coupling member 11 only if the sleeve 19 and ring 31 are mounted in corresponding positions on the two members, and that couplings comprising identical parts can be so assembled that there are three variants of coupling member 10 each of which will mate with only one of three variants of coupling member 11. Thus the basically identical couplings can be used for the supply of, for example, three different liquid fuels, without risk of the wrong fuel being supplied to any receiver, merely by allocating a chosen variant of the coupling members to each fuel.

The sleeve 19 is marked with numerals 1, 2 and 3 as shown in Figure 1, and an arrow 34 on the body 15 co-operates with these numerals to indicate the setting of the sleeve on the body of the coupling member 11. Similarly, numerals 1, 2 and 3 on the ring 31 co-operate with an arrow 35 on the end portion 15 of the coupling member 10.

It will be understood that by suitable arrangement of the parts, two, or more than three positions of the sleeve and ring may be provided for.

I claim:

1. A bayonet-type coupling comprising first and second coupling members, main radial projections on said first coupling member, means defining axially facing surfaces on said second coupling member for engagement by said radial projections to hold the coupling members in coupled relation, longitudinal notches guiding said radial projections into position for engaging said axially facing surfaces, a plurality of additional radial projections selectively positionable about the axis of one coupling member, means defining a plurality of positions for said additional radial projections about the axis of said one coupling member the number of positions being a multiple of the number of additional radial projections, a flange on the other coupling member in the path traversed by said additional projections during relative approach of said coupling members, notches in said flange corresponding in number and spacing to said positions, said positions and notches being so located with respect to the main radial projections and the longitudinal guiding notches therefor that each of the positions is in circumferential register with a notch in the flange when the main radial projections are in any position in which they are in circumferential register with the longitudinal guiding notches, and both sets of projections lie in their associated notches at one stage in the axial approach of one coupling member to the other, a ring formed with a number of notches less than the number of notches in the flange and having a spacing which is a multiple of the spacing of the notches in the flange, and means for fixing said ring to said flange in any position in which the notches therein register with notches in the flange, whereby selective positioning of the notched ring on the flange and selective positioning on the said one coupling member of a number of said additional radial projections equal to the number of notches in the ring determines the positions of the said coupling members one relative to the other in a rotational sense by which the main radial projections will pass through the longitudinal guiding notches.

2. A bayonet-type coupling as claimed in claim 1, including a sleeve, the additional radial projections being mounted on said sleeve, and means being provided to secure the sleeve to the said one coupling member in any one of a plurality of positions about the axis of the said coupling member.

References Cited in the file of this patent
UNITED STATES PATENTS

| 1,074,706 | Ferguson | Oct. 7, 1913 |
| 1,311,145 | Zeindler | July 22, 1919 |
| 2,198,125 | Nelson | Apr. 23, 1940 |